US 9,846,428 B2

(12) United States Patent
Fujimoto et al.

(10) Patent No.: US 9,846,428 B2
(45) Date of Patent: Dec. 19, 2017

(54) CONTROLLER FOR SPINDLE MOTOR

(71) Applicants: The University of Tokyo, Tokyo (JP); DMG MORI SEIKI CO., LTD., Nara (JP)

(72) Inventors: Hiroshi Fujimoto, Tokyo (JP); Teruaki Ishibashi, Tokyo (JP); Shinji Ishii, Nara (JP); Koji Yamamoto, Nara (JP); Yuki Terada, Nara (JP)

(73) Assignees: The University of Tokyo, Tokyo (JP); DMG MORI SEIKI CO., LTD., Nara (JP)

( * ) Notice: Subject to any disclaimer, the term of this patent is extended or adjusted under 35 U.S.C. 154(b) by 574 days.

(21) Appl. No.: 14/475,242

(22) Filed: Sep. 2, 2014

(65) Prior Publication Data
US 2015/0168938 A1 Jun. 18, 2015

(30) Foreign Application Priority Data

Dec. 16, 2013 (JP) .................................. 2013-259086
Mar. 3, 2014 (JP) .................................. 2014-040750

(51) Int. Cl.
*G06F 19/00* (2011.01)
*G05B 19/416* (2006.01)

(52) U.S. Cl.
CPC ............... *G05B 19/4163* (2013.01); *G05B 2219/49077* (2013.01)

(58) Field of Classification Search
None
See application file for complete search history.

(56) References Cited

U.S. PATENT DOCUMENTS 4,970,449 A * 11/1990 Kawamura .......... G05B 19/056
  29/36
4,992,715 A * 2/1991 Nakamura .......... H02P 29/0016
  318/432

(Continued)

FOREIGN PATENT DOCUMENTS

JP       49105277        10/1974
JP    2000126991 A        5/2000

(Continued)

OTHER PUBLICATIONS

C.J. Li et al., "The Effect of Spindle Speed Variation on Chatter Suppression in Rotating-Tool Machining", Materials Science Forum vols. 505-507 (2006) pp. 859-864.*

(Continued)

*Primary Examiner* — Philip Wang
(74) *Attorney, Agent, or Firm* — Miller, Matthias & Hull LLP

(57) ABSTRACT

A controller has a varying speed signal generation unit generating a varying speed command signal varying at predetermined amplitude and period, a current control unit generating a current command signal based on the varying speed command signal, a feedback control unit generating a correction signal based on a deviation between the varying speed command signal and a present rotational speed of the spindle motor and adding the correction signal to the current command signal, and a learning control unit calculating a disturbance component caused by cutting resistance based on the deviation every predetermined rotation angle of the spindle motor and, in synchronism with a rotation angle of the spindle motor corresponding to the varying speed command signal input into the current control unit, generating a compensation signal based on the disturbance component (Continued)

corresponding to the rotation angle and adding the compensation signal to the varying speed command signal.

3 Claims, 10 Drawing Sheets

(56) References Cited

U.S. PATENT DOCUMENTS

| | | | | |
|---|---|---|---|---|
| 5,184,053 | A * | 2/1993 | Maruo | G05B 19/186 318/39 |
| 6,111,382 | A * | 8/2000 | Tsutsui | G05B 19/186 318/569 |
| 2011/0169440 | A1* | 7/2011 | Fujishima | G05B 19/416 318/561 |
| 2011/0234147 | A1* | 9/2011 | Iwashita | B23Q 15/08 318/799 |

FOREIGN PATENT DOCUMENTS

| | | |
|---|---|---|
| JP | 2012091283 A | 5/2012 |
| JP | 2013240837 A | 5/2012 |
| JP | 2013059839 A | 4/2013 |

OTHER PUBLICATIONS

Teruaki Ishibashi, Hiroshi Fujimoto, Shinji Ishii, Koji Yamamoto and Yuki Terada; "High Frequency Variation Speed Control of Spindle Motor for Self-Excited Chatter Vibration Suppression in NC Machine Tools"; The Papers of Technical Meeting on "Mechatronics Control"; The Institute of Electrical Engineers of Japan; Sep. 3, 2013; Lecture No. MEC-13-159.

Teruaki Ishibashi* and Hiroshi Fujimoto (the University of Tokyo); Force Sensorless Control of Cutting Resistance for NC Machine Tools by Spindle Motor Control Utilizing Variable Pulse No. T-method; IC-13-28; MEC-13-28; Mar. 7, 2013; Japan.

* cited by examiner

FIG. 3
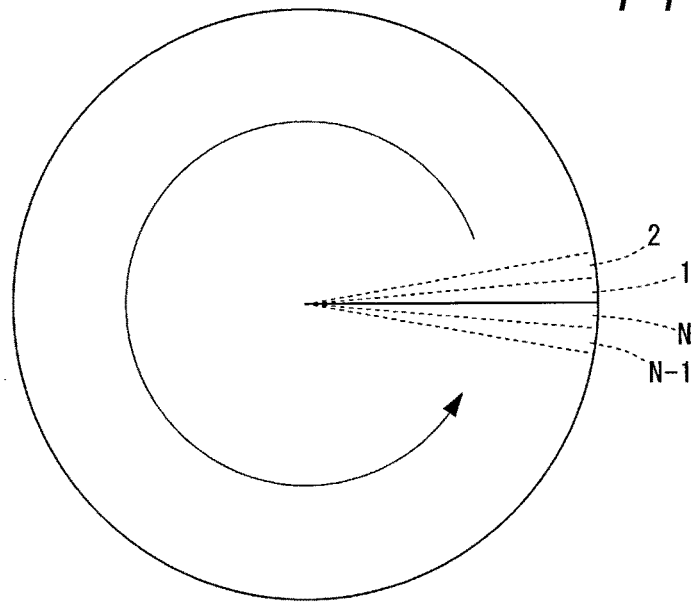
FIG. 4
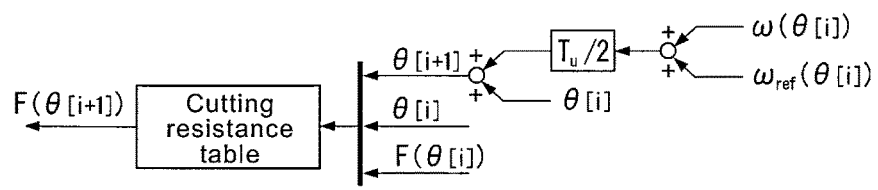
FIG. 5
| Address (i) | Cutting resistance F (θ[i]) |
|---|---|
| 1 | F(θ[1]) |
| 2 | F(θ[2]) |
| ⋮ | ⋮ |
| N−1 | F(θ[N−1]) |
| N | F(θ[N]) |

FIG. 18
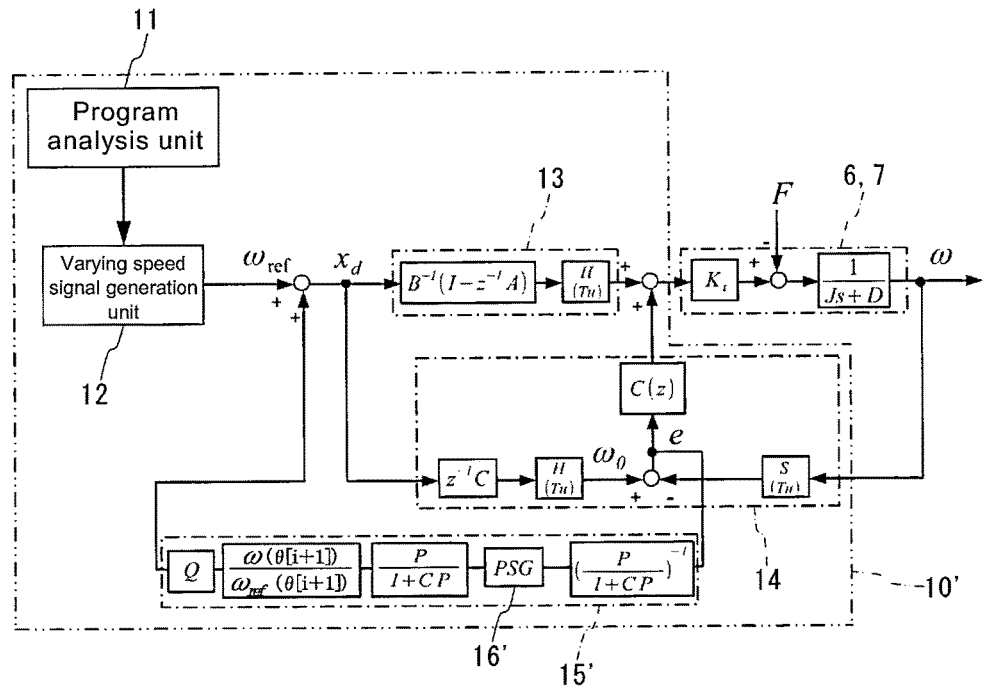
FIG. 19
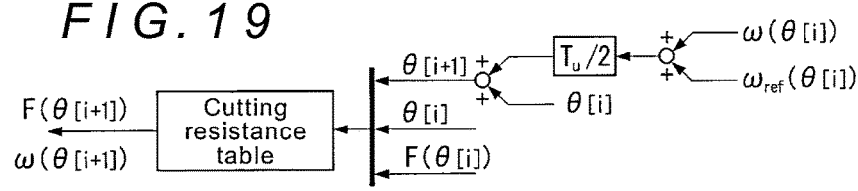
FIG. 20
| Address (i) | Rotational speed $\omega(\theta[i])$ | Cutting resistance $F(\theta[i])$ |
|---|---|---|
| 1 | $\omega(\theta[1])$ | $F(\theta[1])$ |
| 2 | $\omega(\theta[2])$ | $F(\theta[2])$ |
| ⋮ | ⋮ | ⋮ |
| N−1 | $\omega(\theta[N-1])$ | $F(\theta[N-1])$ |
| N | $\omega(\theta[N])$ | $F(\theta[N])$ |

CONTROLLER FOR SPINDLE MOTOR

BACKGROUND

Field of the Disclosure

The present disclosure relates to a controller for controlling a spindle motor of a machine tool, the controller being configured to vary a rotational speed of the spindle motor at predetermined amplitude and period with respect to a target rotational speed and compensate for a tracking error of the rotational speed occurring due to disturbance.

Background of the Disclosure

It has conventionally been well known that, when a workpiece is machined using a machine tool, chatter vibration deteriorates machining accuracy (in particular, surface accuracy). Such chatter vibration is roughly classified into forced chatter vibration and self-excited chatter vibration, and it is considered that forced chatter vibration is caused by an action of an excessively large external force or by synchronization between the frequency of an external force and the resonance frequency of a vibrating system and, on the other hand, self-excited chatter vibration is caused by continuation of cutting in which periodic variation in cutting resistance and periodic variation in thickness of cut enhance each other through interaction therebetween (the so-called "regeneration effect").

Further, conventionally, as a method of suppressing self-excited chatter vibration included in chatter vibration, a technique of periodically varying the rotational speed of a spindle at a predetermined amplitude has been suggested. Furthermore, a technique has been suggested in which the variation amplitude and the variation period of the spindle rotational speed are parameterized and the parameterized variation amplitude and variation period are changed when chatter vibration occurs.

SUMMARY OF THE DISCLOSURE

Incidentally, in the techniques generally disclosed above, the spindle rotational speed is varied at predetermined variation amplitude and variation period so as to break the periodicities of the variation in cutting resistance and the variation in thickness of cut, and thereby, self-excited chatter vibration is suppressed. Therefore, self-excited chatter vibration is more suppressed when the variation amplitude of the spindle rotational speed is larger and, to the contrary, self-excited chatter vibration is more suppressed when the variation period of the spindle rotational speed is shorter.

FIGS. 15 and 16 depict a state of displacement of a tool obtained when performing a machining simulation using CAE analysis or the like in which the spindle rotational speed is varied at a predetermined variation amplitude $(2 \times N_A)$ [rad/s] and a predetermined period (T) [s] as shown in FIG. 14. FIG. 15 shows a state diagram whose horizontal axis represents a speed variation rate RVA and whose vertical axis represents a speed variation period ratio RVF and which shows the magnitude (level) of displacement (vibration) of the tool which is color-coded according to the magnitude of displacement and further is represented in gray scale. Further, FIG. 16 shows a state diagram whose vertical axis represents the displacement of the tool and whose horizontal axes represent the speed variation rate RVA and the speed variation period ratio RVF and which shows the magnitude of displacement of the tool which is color-coded according to the magnitude of displacement similarly to the above and represented in a three-dimensional manner and further is represented in gray scale. In the color coding, red becomes deeper as the displacement becomes larger, blue becomes deeper as the displacement becomes smaller, and the middle is yellow. It is noted that the speed variation rate RVA and speed variation period ratio RVF are represented by the following equations:

$$RVA = N_A/N_0, \text{ and}$$

$$RVF = 2\pi/(N_0 \times T),$$

where $N_0$ is an average rotational speed [rad/s] of the spindle.

Further, in the above machining simulation, the feed rate Vs of the tool is set to 2×10-3 [m/s], the width of cut a to 5×10-3 [m], the intrinsic cutting force Kt to 300 [MPa], the dynamic mass M to 10 [Ns2/m], the mechanical impedance B to 200 [Ns/m], and the dynamic rigidity K to 5×105 [N/m]. In addition, the average rotational speed N0 of the spindle is set to 262 [rad/s], at which self-excited chatter vibration occurs, and the speed variation rate RVA and the speed variation period ratio RVF are each changed in a range of 0.001 or more to less than 1.0.

As shown in FIGS. 15 and 16, it is understood that the displacement, i.e., vibration of the tool is reduced as the speed variation rate RVA and the speed variation period ratio RVF are each increased. Further, it is understood that sharp suppression of self-excited chatter vibration of the tool starts near a point at which the speed variation rate RVA reaches 0.05 and the displacement of the tool is well suppressed in an area in which the speed variation rate RVA is smaller than 0.05.

Further, FIG. 7 shows the displacement of the tool obtained when, in this example, the speed variation period ratio RVF is changed with the speed variation rate RVA fixed to 0.1. It is found that, in this case, setting the speed variation period ratio RVF to a value equal to or larger than 0.5 suppresses self-excited chatter vibration of the tool.

As understood from FIGS. 15 to 17, self-excited chatter vibration is more suppressed as the speed variation rate RVA and the speed variation period ratio RVF are each increased, that is, as the variation amplitude of the spindle rotational speed is increased and, to the contrary, self-excited chatter vibration is more suppressed as the variation period is reduced.

However, although increasing the variation amplitude of the spindle rotational speed provides the advantage that self-excited chatter vibration can be stably suppressed, in the case of a lathe, for example, it causes a large variation in the feed amount of tool per revolution of workpiece, and similarly in the case of a machining center, it causes a large variation in the feed amount per revolution of tool, and in both cases, a problem that surface roughness of a machined workpiece surface is not uniform, that is, machining accuracy is deteriorated is brought about.

On the other hand, as for the variation period of the spindle rotational speed, similarly, self-excited chattering vibration is more suppressed as the variation period becomes shorter, whereas there is a tendency that the surface roughness of a machined workpiece surface is made non-uniform by varying the spindle rotational speed at a short period, which results in deterioration of machining accuracy. However, the influence of reducing the variation period on machining accuracy is small as compared with the above-described case of increasing the variation amplitude.

Therefore, for obtaining a preferable machining accuracy while suppressing self-excited chatter vibration, it is preferred that the variation amplitude of the spindle rotational speed is made as small as possible while the variation period is made as short as possible.

However, according to the research conducted by the present inventors, they have found that, when the variation period of the spindle rotational speed is set to a short period, because cutting resistance as a disturbance input to the spindle motor varies at a short period, there is a problem that there is a possibility that a tracking error cannot be preferably compensated for by an ordinary feedback control in which deviation between a commanded rotational speed and an actual rotational speed is compensated for, and self-excited chatter vibration therefore cannot be suppressed as scheduled.

The present disclosure has been achieved in view of the above-described circumstances, and an object thereof is to provide a controller capable of varying a rotational speed of a spindle motor at predetermined amplitude and period and compensating for a tracking error of the rotational speed occurring due to disturbance more stably as compared with the conventional controller.

The present disclosure, for solving the above-described problems, relates to a controller for controlling a spindle motor which rotates a spindle of a machine tool, comprising:

a varying speed signal generation unit which receives a speed command signal relating to a target rotational speed of the spindle motor and generates a varying speed command signal varying at predetermined amplitude and period with respect to the target rotational speed and outputs the generated varying speed command signal;

a current control unit which generates a current command signal for driving the spindle motor based on the varying speed command signal input from the varying speed signal generation unit and outputs the generated current command signal;

a feedback control unit which generates a correction signal based on a deviation between the varying speed command signal output from the varying speed signal generation unit and a signal relating to a present rotational speed of the spindle motor and adds the generated correction signal to the current command signal; and a learning control unit which successively calculates a disturbance component caused by cutting resistance in machining based on the deviation every predetermined rotation angle of the spindle motor and stores the calculated disturbance component therein and which, in synchronism with a rotation angle of the spindle motor corresponding to the varying speed command signal input from the varying speed signal generation unit into the current control unit, generates a compensation signal based on the disturbance component corresponding to the rotation angle and adds the generated compensation signal to the varying speed command signal.

According to this controller, when the spindle motor is driven, first, a speed command signal relating to a target rotational speed is input into the varying speed signal generation unit. For example, when the spindle motor is driven in accordance with an NC program, the target rotational speed is designated in the NC program and a speed command signal relating to the designated target rotational speed is input into the varying speed signal generation unit as appropriate. Then, once the speed command signal is input into the varying speed signal generation unit, the varying speed signal generation unit generates a varying speed command signal varying at predetermined amplitude and period with respect to the received target rotational speed and transmits the generated varying speed command signal to the current control unit.

Subsequently, the current control unit generates a current command signal for driving the spindle motor based on the varying speed command signal input from the varying speed signal generation unit and outputs the generated current command signal, and the spindle motor is driven in accordance with the current command signal. At this time, a correction signal is generated by the feedback control unit based on a deviation between the varying speed command signal output from the varying speed signal generation unit and a signal relating to a present rotational speed of the spindle motor, and the generated correction signal is added to the current command signal.

Further, the learning control unit successively calculates a disturbance component caused by cutting resistance in machining based on the deviation every predetermined rotation angle of the spindle motor and stores the calculated disturbance components therein. Further, the learning control unit generates, in synchronism with a rotation angle of the spindle motor corresponding to the varying speed command signal input from the varying speed signal generation unit into the current control unit, a compensation signal based on the disturbance component corresponding to the rotation angle and adds the generated compensation signal to the varying speed command signal.

Thus, according to the controller of the present disclosure, first, by the feedback control unit, a correction signal corresponding to a deviation between a varying speed command signal output form the varying speed signal generation unit and a signal relating to a present rotational speed of the spindle motor, that is, corresponding to a tracking error is generated and correction is performed based on this correction signal.

The tracking error includes an error occurring due to disturbance such as a friction force of the spindle motor and cutting resistance and this error is corrected by the feedback control unit. However, in the case where the rotational speed of the spindle motor is varied at predetermined variation amplitude and variation period, periodic variation also occurs in the cutting resistance due to the periodic variation of the rotational speed, and therefore a case occurs that a tracking error caused by the periodically varying cutting resistance cannot be sufficiently suppressed by an ordinary feedback control. Particularly, as described above, when the variation period is set to a short period in order to suppress self-excited chatter vibration while keeping machining accuracy good, the tracking error caused by cutting resistance cannot be suppressed.

Therefore, in the present disclosure, as described above, the learning control unit calculates (estimates) a disturbance component caused by cutting resistance in machining successively (one by one) based on the deviation every predetermined rotation angle of the spindle motor and stores the calculated disturbance component therein, while the learning unit reads out, in synchronism with a rotation angle of the spindle motor corresponding to the varying speed command signal input from the varying speed signal generation unit into the current control unit, the disturbance component corresponding to the rotation angle, that is, a disturbance component estimated one revolution before with respect to the rotation angle, and generates a compensation signal for cancelling the read-out disturbance component based on the read-out disturbance component and adds the generated compensation signal to the varying speed command signal, thereby previously compensating for a tracking error which will occur due to the disturbance component, that is, performing a feed-forward control. Thereby, the tracking error caused by cutting resistance, which cannot be sufficiently suppressed by the feedback control, can be suppressed.

As described above, according to the controller of the present disclosure, even when the spindle motor is driven with the rotational speed thereof varied at predetermined variation amplitude and variation period in order to suppress self-excited chatter vibration while keeping machining accuracy good, the tracking error caused by cutting resistance can be more stably compensated for.

It is noted that, when the disturbance component is represented as $F_\theta(s)$ and the compensation signal is represented as $C_{F\theta}(s)$, the learning control unit can calculate the disturbance component $F_\theta(s)$ and the compensation signal $C_{F\theta}(s)$ according to the following equations, respectively:

$$F_\theta(s) = e_\theta(s) \cdot (1 + C(s) \cdot P(s)) / P(s); \text{ and}$$

$$C_{F\theta}(s) = F_\theta(s) \cdot P(s) / (1 + C(s) \cdot P(s)),$$

where $F_\theta(s)$ is a disturbance component when the rotation angle of the spindle motor is $\theta$, $e_\theta(s)$ is a deviation when the rotation angle of the spindle motor is $\theta$, $C_{F\theta}(s)$ is a compensation signal when the rotation angle of the spindle motor is $\theta$, $C(s)$ is a transfer function when the correction signal is generated in the feedback control unit, and $P(s)$ is a transfer function of the spindle motor.

Further, in the present disclosure, the learning control unit may be configured to: successively calculate a disturbance component caused by cutting resistance in machining based on the deviation at every predetermined rotation angle of the spindle motor and store the calculated disturbance component and an actual rotational speed of the spindle motor at the position of the rotation angle with them related to each other for each of the rotation angles; in synchronism with a rotation angle of the spindle motor corresponding to the varying speed command signal input from the varying speed signal generation unit into the current control unit, generate a compensation signal based on the disturbance component and the actual rotational speed corresponding to the rotation angle and based on the varying speed command signal; and add the generated compensation signal to the varying speed command signal.

Since the cutting resistance is in proportion to the thickness of chip, it is in inverse proportion to the rotational speed of the spindle motor, and, in a steady state, the magnitude of the cutting resistance depends on the rotation angle $\theta$ of the spindle motor and is represented by the following equation:

$$\text{Cutting Resistance} = (k \times v / \omega) \times g(\theta),$$

where k is a cutting resistance coefficient (N), $g(\theta)$ is a function that depends on the spindle angle of a period $2\pi$, v is a feed rate (m/s) of a tool, that is, the spindle, and $\omega$ is the rotational speed of the spindle, that is, the rotational speed (rad/s) of the spindle motor.

Thus, since the disturbance component caused by cutting resistance depends on the rotational speed of the spindle motor, the disturbance component calculated based on the deviation has a magnitude corresponding to the actual rotational speed of the spindle motor at that time. Therefore, at the rotation angle of the spindle motor corresponding to the varying speed command signal, the disturbance component estimated one revolution before is not an accurate estimated value of a disturbance component which will occur due to the varying speed command signal unless the actual rotational speed of the spindle motor at that time is coincident with the value relating to the varying speed command signal. In other words, the estimated disturbance component does not become an accurate value unless it is corrected using a ratio of the actual rotational speed at that time to the value relating to the varying speed command signal.

Therefore, generating the compensation signal based on the disturbance component and the actual rotational speed corresponding to the rotation angle of the varying speed command signal and based on the varying speed command signal as described above makes it possible to generate a more accurate compensation signal, which results in effective suppression of the tracking error.

It is noted that, in this case, when the disturbance component is represented as $F_\theta(s)$ and the compensation signal is represented as $C_{F\theta}(s)$, the learning control unit can calculate the disturbance component $F_\theta(s)$ and the compensation signal $C_{F\theta}(s)$ according to the following equations, respectively:

$$F_\theta(s) = e_\theta(s) \cdot (1 + C(s) \cdot P(s)) / P(s); \text{ and}$$

$$C_{F\theta}(s) = \omega(\theta) \cdot F_\theta(s) \cdot P(s) / (\omega_{ref}(\theta) \cdot (1 + C(s) \cdot P(s))),$$

where $F_\theta(s)$ is a disturbance component when the rotation angle of the spindle motor is $\theta$, $e_\theta(s)$ is a deviation when the rotation angle of the spindle motor is $\theta$, and $C_{F\theta}(s)$ is a compensation signal when the rotation angle of the spindle motor is $\theta$. Further, $\omega(\theta)$ is the actual rotational speed when the rotation angle of the spindle motor is $\theta$, and it is a scalar value. Further, $\omega_{ref}(\theta)$ is a commanded rotational speed of the varying speed command signal when the rotation angle of the spindle motor is $\theta$, and it is a scalar value. Furthermore, $C(s)$ is a transfer function when the correction signal is generated in the feedback control unit, and $P(s)$ is a transfer function of the spindle motor.

According to the controller of the present disclosure, even when the spindle motor is driven with the rotational speed thereof varied at predetermined variation amplitude and variation period in order to suppress self-excited chatter vibration while keeping machining accuracy good, a tracking error caused by cutting resistance can be stably compensated for as compared with the conventional controller.

Further, generating the compensation signal based on the disturbance component and the actual rotational speed corresponding to the rotation angle of the varying speed command signal and based on the varying speed command signal makes it possible to generate a more accurate compensation signal, which results in more effective suppression of the tracking error.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

For a more complete understanding of the disclosed methods and apparatus, reference should be made to the embodiment illustrated in greater detail on the accompanying drawings, wherein:

FIG. 3 is an explanatory diagram for explaining a function of a learning control unit according to the first embodiment;

FIG. 4 is an explanatory diagram for explaining the function of the learning control unit according to the first embodiment;

FIG. 5 is an explanatory diagram for explaining the function of the learning control unit according to the first embodiment;

FIG. 18 is a block diagram showing a configuration of a controller according to a second embodiment of the present disclosure;

FIG. 19 is an explanatory diagram for explaining a function of a learning control unit according to the second embodiment;

FIG. 20 is an explanatory diagram for explaining the function of the learning control unit according to the second embodiment;

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Hereinafter, specific embodiments of the present disclosure will be described with reference to the drawings.

First Embodiment

Figure 1:
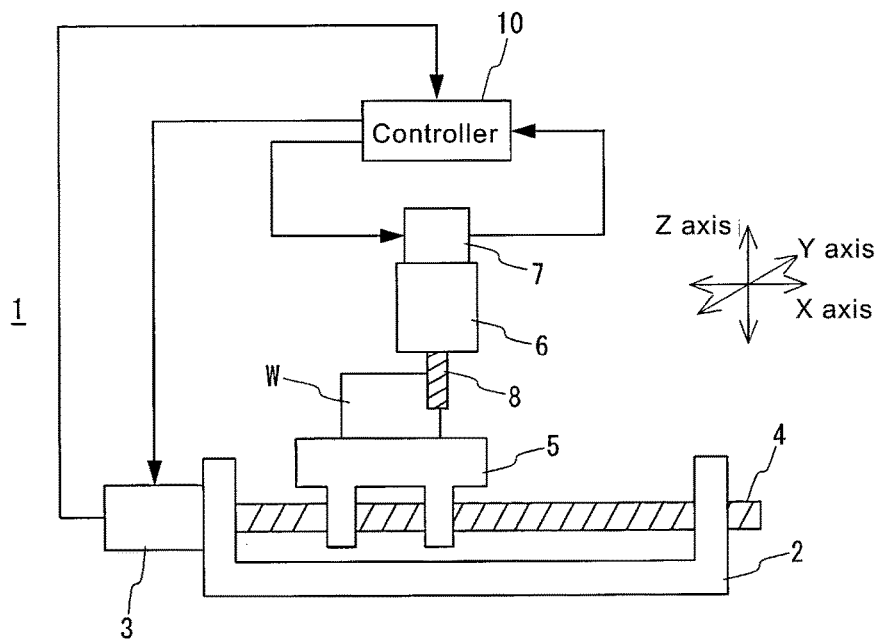
FIG. 1 is an explanatory diagram showing a schematic configuration of a machine tool according to a first embodiment of the present disclosure.

FIG. 1 is an explanatory diagram showing a schematic configuration of a machine tool according to a first embodiment of the present disclosure. As shown in the same FIG. 1, a machine tool 1 of this embodiment includes a base 2, a ball screw 4 supported by the base 2 to be rotatable, a feed motor 3 which rotates the ball screw 4 about its axis, a table 5 which is screwed to the ball screw 4 and is moved in the axial direction of the ball screw 4 (X-axis direction) by the rotation of the ball screw 4, a spindle 6 disposed in an area above the table 5, a spindle motor 7 which rotates the spindle 6 about its axis, a controller 10 which numerically controls the feed motor 3 and the spindle motor 7, and other components.

It is noted that, although, for the sake of convenience, FIG. 1 depicts only a feed mechanism (the ball screw 4 and the feed motor 3) for moving the table 5 in the X-axis direction, the machine tool 1 also includes a feed mechanism for moving the table 5 and the spindle 6 relative to each other in the Y-axis and Z-axis directions shown in FIG. 1 and operation of this feed mechanism is also controlled by the controller 10.

Thus, in the machine tool 1, under the control by the controller 10, the table 5 and the spindle 6 are moved relative to each other along the three orthogonal axes: the X axis, the Y axis, and the Z axis by the feed mechanisms including the feed motor 3 and the spindle motor 7. Further, a workpiece W is placed on the table 5 and a tool 8 is attached to the spindle 6, and the table 5 and the spindle 6 are moved relative to each other as appropriate in a state where the spindle 6 is rotated at a predetermined rotational speed, thereby machining the workpiece W.

It is noted that, obviously, the machine tool is not limited to a machine tool having the above-described configuration and includes, besides an NC lathe, every type of known machine tool that cuts and machines a workpiece through relative rotation between a tool and the workpiece.

Figure 2:
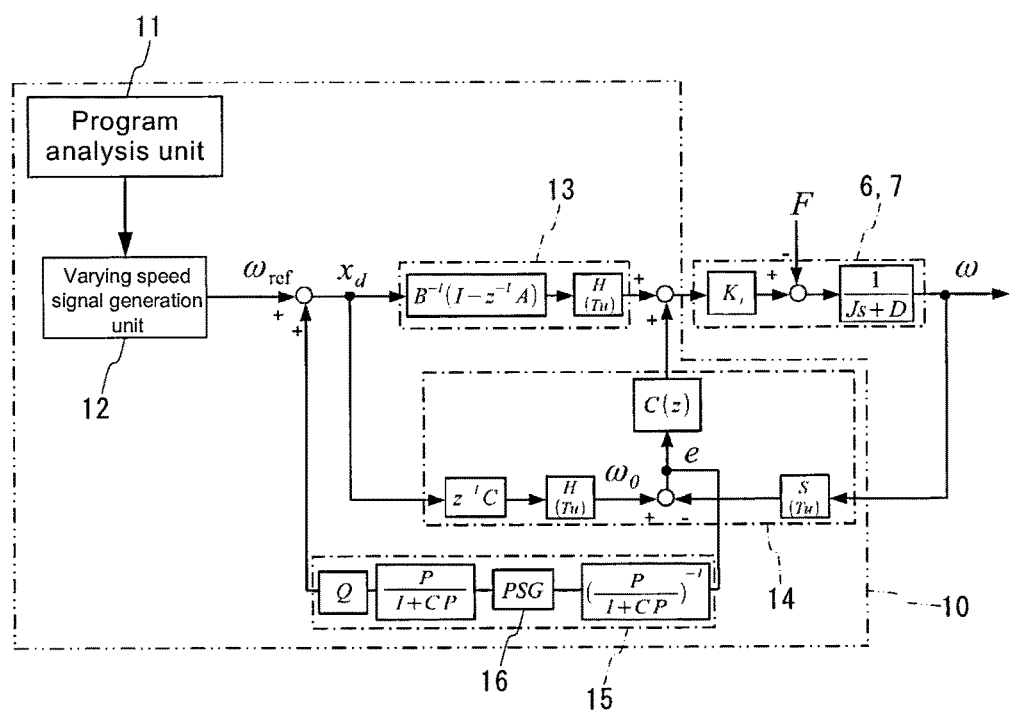
FIG. 2 is a block diagram showing a configuration of a controller according to the first embodiment.

As shown in FIG. 2, the controller 10 has a program analysis unit 11, a varying speed signal generation unit 12, a current control unit 13, a feedback control unit 14, a learning control unit 15, and other components. It is noted that, although not shown in FIG. 2, the controller 10 of this embodiment further has a storage unit storing an NC program therein and a control unit controlling the feed motor 3, etc.

The program analysis unit 11 analyzes an NC program stored in the storage unit or an NC program input as appropriate, extracts a command relating to the rotational speed of the spindle motor 7 contained in the NC program, and transmits the extracted speed command signal to the varying speed signal generation unit 12.

Figure 14:
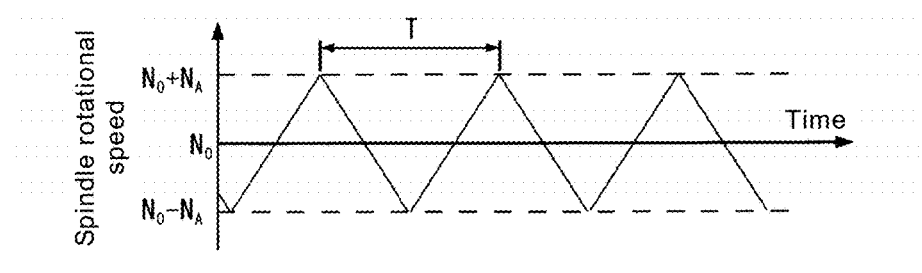
FIG. 14 is an explanatory diagram for explaining a variation amplitude and a variation period of the rotational speed of the spindle motor.
Figure 15:
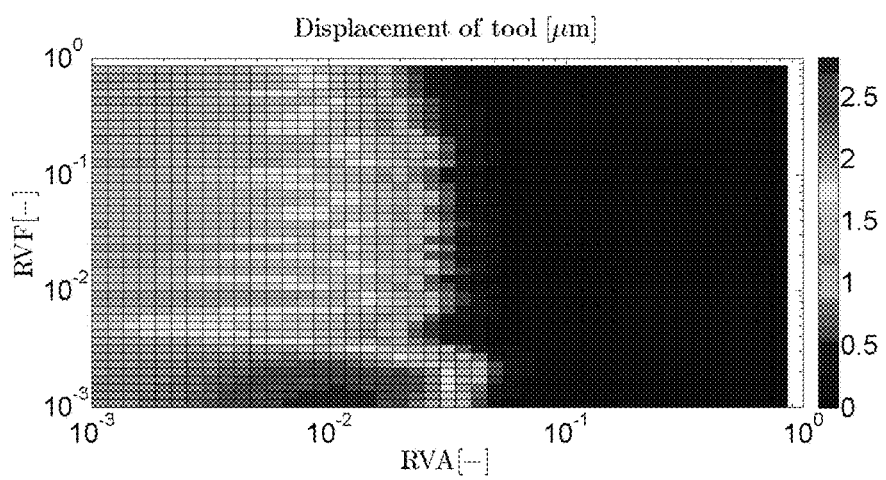
FIG. 15 is a state diagram showing a correlation between a speed variation rate RVA, a speed variation period ratio RVF, and displacement (vibration) of a tool.
Figure 16:
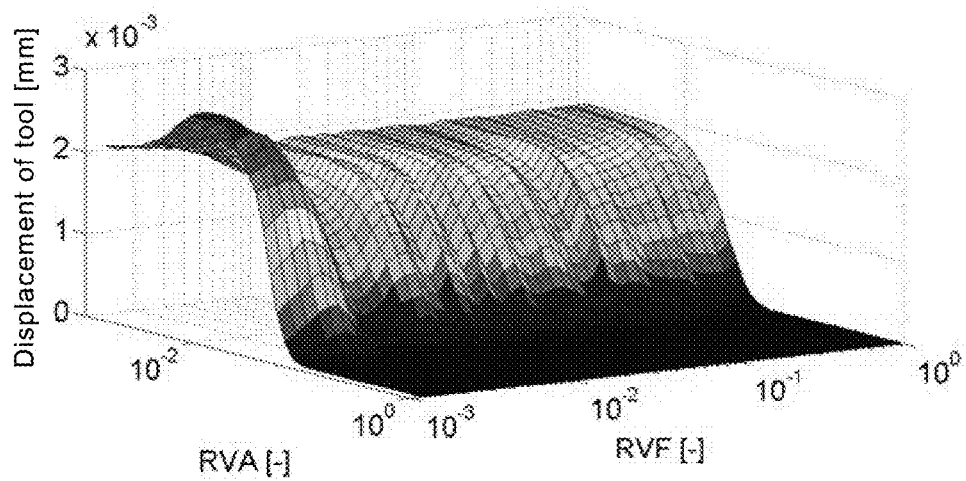
FIG. 16 is a state diagram showing the correlation between the speed variation rate RVA, the speed variation period ratio RVF, and the displacement (vibration) of the tool.
Figure 17:
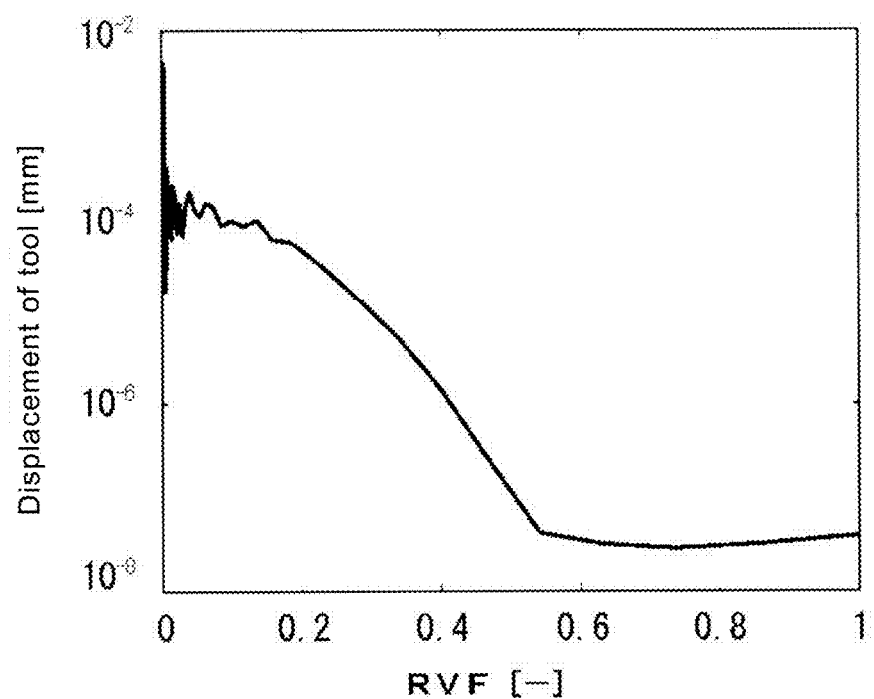
FIG. 17 is an explanatory diagram showing displacement of the tool that results when the speed variation period ratio RVF is changed with the speed variation rate RVA set to 0.1.

Based on the speed command signal received from the program analysis unit 11, the varying speed signal generation unit 12 generates a varying speed command signal $\omega_{ref}$ varying at predetermined amplitude and period with a rotational speed of the speed command signal used as a target rotational speed and outputs the generated varying speed command signal to the current control unit 13. Although a triangular waveform as shown in FIG. 14 can be given as an example of the waveform varying the rotational speed, the waveform is not limited thereto and may be a sinusoidal waveform or a trapezoidal waveform, for example. It is noted that, as described above, $N_0$ is the target rotational speed (average rotational speed) [rad/s], the variation amplitude is $2 \times N_A$ [rad/s], and the variation period is T [s].

The current control unit 13 generates a current command signal for driving the spindle motor 7 based on the varying speed command signal ωref received from the varying speed signal generation unit 12 and outputs the generated current command signal to the spindle motor 7 to drive the spindle motor 7. It is noted that the spindle motor 7 is supplied with a current corresponding to the current command signal output from the current control unit 13. $B^{-1}(I-z^{-1}A)$ and H (Tu) in FIG. 2 are each a transfer function. Further, $K_t$ and $1/(Js+D)$ in a block corresponding to the spindle motor 7 are also each a transfer function, and $K_t$ is a torque constant [Nm/A], Js is an inertia [kg·m2] of the spindle 6 including a tool, and D is a friction coefficient [Nm·s] of the spindle motor 7.

The feedback control unit 14 calculates a deviation (a tracking error) e [rad/s] between an actual rotational speed ω [rad/s] of the spindle motor 7 detected by a rotary encoder attached to the spindle motor 7 or the like and a nominal value $\omega_0$ [rad/s] of the varying speed command $\omega_{ref}$ output from the varying speed signal generation unit 12 at predetermined time intervals and successively generates correction signals (current command signals) for cancelling the deviations e [rad/s] based on the obtained deviations e [rad/s] and adds the generated correction signals to the signal output from the current control unit 13. In FIG. 2, S(Tu) is a transfer function for calculating the actual rotational speed ω [rad/s] of the spindle motor 7, $z^{-1}C$ and H(Tu) are transfer functions for calculating the nominal value $\omega_0$ [rad/s], and C(z) is a transfer function for generating the correction signal based on the deviation e [rad/s].

The learning control unit 15 is a processing unit for successively calculating (estimating) a cutting resistance F, which is a disturbance component, based on the deviation e [rad/s] calculated in the feedback control unit 14 every predetermined rotation angle (phase θ) of the spindle motor 7 and storing the calculated cutting resistances F in a memory within a periodic signal generator (PSG) 16, and, in synchronism with a rotation angle (phase) of the spindle motor 7 corresponding to the varying speed command signal $\omega_{ref}$ input from the varying speed signal generation unit 12 into the current control unit 13, generating a compensation signal based on the estimated cutting resistance F corresponding to the rotation angle (phase) and adding the generated compensation signal to the varying speed command signal $\omega_{ref}$.

The phase θ is defined by dividing one revolution of the spindle motor 7 by N (an integer) as shown in FIG. 3 and the learning control unit 15 stores the estimated cutting resistances F (θ[i]) of the phases θ[i] as a data table as shown in FIG. 5 in the memory. It is noted that i is integers from 1 to N.

The actual rotation angle (actual phase θ) of the spindle motor 7 is detected by the rotary encoder or the like and the following equation holds between the cutting resistance Fθ(s) and the actual rotational speed ω(θ) at a certain phase θ.

$$\omega(\theta)=\omega_0(\theta)-(F_\theta(s)\cdot P(s)/(1+C(s)\cdot P(s))) \qquad \text{(Equation 1)}$$

Further, since, as described above, the deviation e (θ) is a difference between the nominal value $\omega_0$ (θ) and the actual rotational speed ω (θ), that is, $$e(\theta)=\omega_0(\theta)-\omega(\theta), \qquad \text{(Equation 2)}$$

the cutting resistance $F_\theta(s)$ is estimated by the following equation based on the Equations 1 and 2:

$$F_\theta(s)=e_\theta(s)\cdot(1+C(s)\cdot P(s))/P(s), \qquad \text{(Equation 3)}$$

where $F_\theta(s)$ is a disturbance component when the rotation angle of the spindle motor is θ, $e_\theta(s)$ is a deviation when the rotation angle of the spindle motor is θ, C(s) is a transfer function when the correction signal is generated in the feedback control unit 14, and P(s) is a transfer function of the spindle motor 7.

The learning control unit 15 successively calculates an estimated cutting resistance F(θ[i]) for each phase θ[i] according to the Equation 3 and successively stores the calculated estimated cutting resistances F(θ[i]) as a data table (cutting resistance table) as shown in FIG. 5 in the memory of the PSG 16 while updating the data table.

On the other hand, the learning control unit 15 calculates a phase θ of the spindle motor 7 corresponding to the varying speed command signal $\omega_{ref}$ input from the varying speed signal generation unit 12 into the current control unit 13, reads out the estimated cutting resistance F (θ) corresponding to the phase θ from the memory, and generates a compensation signal based on the estimated cutting resistance F (θ) read out and adds the generated compensation signal to the varying speed command signal $\omega_{ref}$.

The phase θ of the spindle motor 7 corresponding to the varying speed command signal $\omega_{ref}$ is a phase θ[i+1] which is advanced by one phase from the actual phase θ[i] of the spindle motor 7, and the phase θ[i+1] is calculated by the following equation:

$$\theta[i+1]=\theta[i]+(\omega(\theta[i])+\omega_{ref}(\theta[i]))\cdot Tu/2, \qquad \text{(Equation 4)}$$

where Tu is a control period.

The learning control unit 15 reads out the estimated cutting resistance F (θ[i+1]) corresponding to the phase θ[i+1] from the memory based on the phase θ[i+1] calculated by the Equation 4 and generates a compensation signal $C_F(\theta[i+1])$ by the following equation based on the estimated cutting resistance F(θ[i+1]) read out.

$$C_{F\theta}(s)=F_\theta(s)\cdot P(s)/(1+C(s)\cdot P(s)), \qquad \text{(Equation 5)}$$

where $C_{F\theta}(s)$ is a compensation signal when the rotation angle of the spindle motor 7 is θ, $F_\theta(s)$ is a disturbance component when the rotation angle of the spindle motor 7 stored in the memory is θ, C(s) is a transfer function when the correction signal is generated in the feedback control unit, and P(s) is a transfer function of the spindle motor.

It is noted that a conceptual block diagram showing the processing of calculating the phase θ[i+1], the processing of storing the estimated cutting resistance F(θ[i]), and the processing of reading out the estimated cutting resistance F (θ[i+1]) is shown in FIG. 4.

Subsequently, the learning control unit 15 multiplies the calculated compensation signal $C_F(\theta[i+1])$ by a function Q[z], and then adds the result of the multiplication to the varying speed command signal $\omega_{ref}$ (θ[i+1]) input from the varying speed signal generation unit 12 into the current control unit 13. It is noted that the function Q[z] is a Q filter represented by the following equation, where γ=2.

$$Q[z]=(1+\gamma z^{-1}+z^{-2})/(\gamma+2) \quad \text{(Equation 6)}$$

Thus, according to the controller 10 of this embodiment having the above-described configuration, the program analysis unit 11 analyzes as an NC program stored in the storage unit as appropriate or an NC program input as appropriate, extracts a command relating to the rotational speed of the spindle motor 7 contained in the NC program, and transmits the extracted speed command signal to the varying speed signal generation unit 12.

Once the speed command signal is input into the varying speed signal generation unit 12, the varying speed signal generation unit 12 generates a varying speed command signal ωref varying at predetermined amplitude and period with respect to a received target rotational speed and transmits the generated varying speed command signal to the current control unit 13.

Subsequently, the current control unit 13 generates a current command signal for driving the spindle motor 7 based on the varying speed command signal $\omega_{ref}$ input from the varying speed signal generation unit 12 and outputs the generated varying speed command signal ωref, and the spindle motor 7 is driven according to the current command signal. At this time, a correction signal is generated based on a deviation e between a nominal value $\omega_0$ of the varying speed command signal $\omega_{ref}$ output from the varying speed signal generation unit 12 and an actual rotational speed ω of the spindle motor 7 by the feedback control unit 14, and the generated correction signal is added to the current command signal.

Further, the learning control unit 15 successively calculates a disturbance component caused by cutting resistance in machining based on the deviation every predetermined phase θ of the spindle motor 7e and stores the calculated disturbance components therein, and, in synchronism with a phase θ of the spindle motor 7 corresponding to the varying speed command signal $\omega_{ref}$ input from the varying speed signal generation unit 12 into the current control unit 13, generates a compensation signal based on the disturbance component corresponding to the phase θ and adds the generated compensation signal to the varying speed command signal.

Thus, according to the controller 10 of this embodiment, first, the feedback control unit 14 generates a correction signal corresponding to the deviation e between the nominal value $\omega_0$ of the varying speed command signal $\omega_{ref}$ output from the varying speed signal generation unit 12 and the present rotational speed ω of the spindle motor 7, that is, a tracking error e and correction is performed using the correction signal.

The tracking error e includes an error occurring due to disturbance, such as a friction force of the spindle motor 7 and a cutting resistance F, and this error is corrected by the feedback control unit 14. However, in a case where the rotational speed of the spindle motor 7 is varied at predetermined variation amplitude and variation period, periodic variation also occurs in the cutting resistance F due to the periodic variation of the rotational speed, so that there may occur a case where a tracking error e caused by the periodically varying cutting resistance F cannot be sufficiently suppressed by the feedback control unit 14. Particularly, as described above, when the variation period is set to a short period in order to suppress self-excited chatter vibration while keeping machining accuracy good, the tracking error e caused by the cutting resistance F cannot be suppressed.

In the controller 10 of this embodiment, as described above, by the learning control unit 15, a disturbance component caused by the cutting resistance F in machining are calculated based on the deviation e every predetermined phase θ of the spindle motor 7 and the calculated components are stored, and, in synchronism with a phase θ of the spindle motor 7 corresponding to the varying speed command signal ωref input from the varying speed signal generation unit 12 into the current control unit 13, the disturbance component corresponding to the phase θ, that is, a disturbance component estimated one revolution before with respect to the phase θ is read out, a compensation signal for cancelling the disturbance component read out is generated based on the disturbance component read out, and the generated compensation signal is added to the varying speed command signal ωref to previously correct a tracking error e which will occur due to the disturbance component, that is, a feed-forward control is performed. Thereby, the tracking error e caused by the cutting resistance F which cannot be sufficiently suppressed by the feedback control can be suppressed.

As described above, according to the controller 10 of this embodiment, even when the spindle motor 7 is driven with the rotational speed thereof varied at predetermined variation amplitude and variation period in order to suppress self-excited chatter vibration while keeping machining accuracy good, the tracking error e caused by the cutting resistance F can be more stably compensated for.

Figure 6:
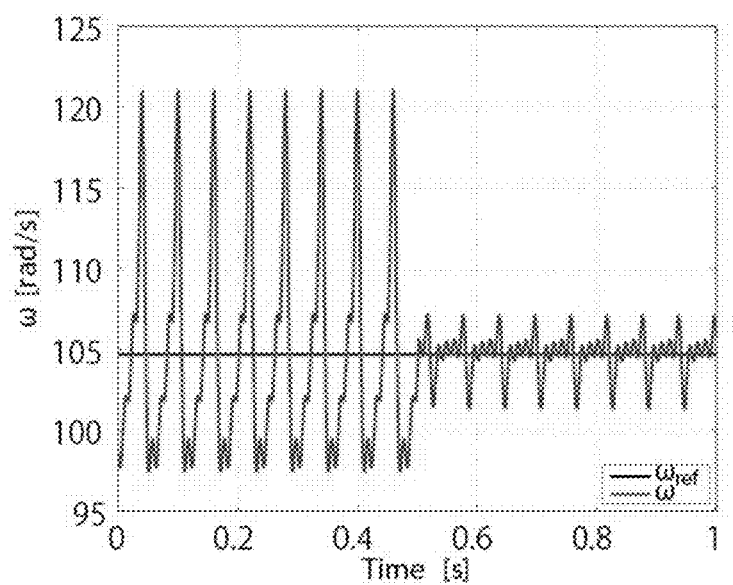
FIG. 6 is an explanatory diagram showing the rotational speed of a spindle motor in a period where compensation by the learning control unit is not performed and in a period where the compensation by the learning control unit is performed, in a machining simulation performed with a commanded rotational speed of the spindle motor kept at a constant value of 104.7 [rad/s]
Figure 7:
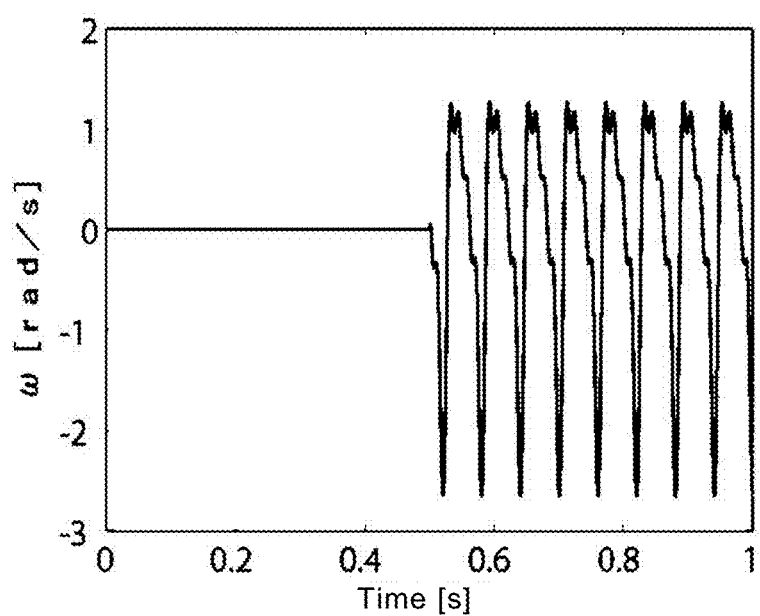
FIG. 7 is an explanatory diagram showing a compensation signal in the learning control unit in the example shown in FIG. 6.

In this connection, FIG. 6 depicts a rotational speed ω [rad/s] of the spindle motor 7 obtained when a machining simulation was performed with cutting resistance set as appropriate and a command value of the rotational speed of the spindle motor 7 set to a constant speed of 104.7 [rad/s]. It is noted that, in this example, a speed signal generation unit which does not vary the rotational speed, that is, generates a speed command signal relating to a constant rotational speed and outputs the generated speed command signal was used instead of the varying speed signal generation unit 12 shown in FIG. 2. Further, a resolution N of the phase θ is set to 10000 and, as shown in FIG. 7, on and after a time 0.5 [s], compensation signals generated by the learning control unit 15 (compensation signals shown in FIG. 7) were added to the speed command signal output from the speed signal generation unit.

As understood from FIG. 6, although the rotational speed of the spindle motor 7 varies largely until 0.5 [s] after the start, on and after 0.5 [s], disturbance caused by cutting resistance is suppressed by addition of the compensation signals generated by the learning control unit 15. A tracking error which still remains after the addition of the compensation signals is caused by a delay due to the Q filter. It is noted that, in FIG. 6, a black solid line indicates the speed command signal $\omega_{ref}$ and a gray solid line indicates the actual rotational speed ω of the spindle motor 7.

Figure 8:
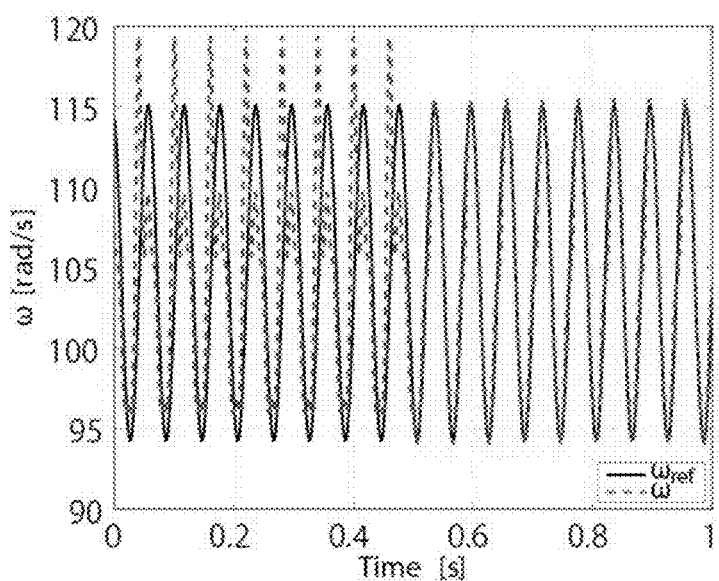
FIG. 8 is an explanatory diagram showing the rotational speed of the spindle motor in a period where the compensation by the learning control unit is not performed and in a period where the compensation by the learning control unit is performed, in a machining simulation performed the commanded rotational speed of the spindle motor varied in a sinusoidal waveform.
Figure 9:
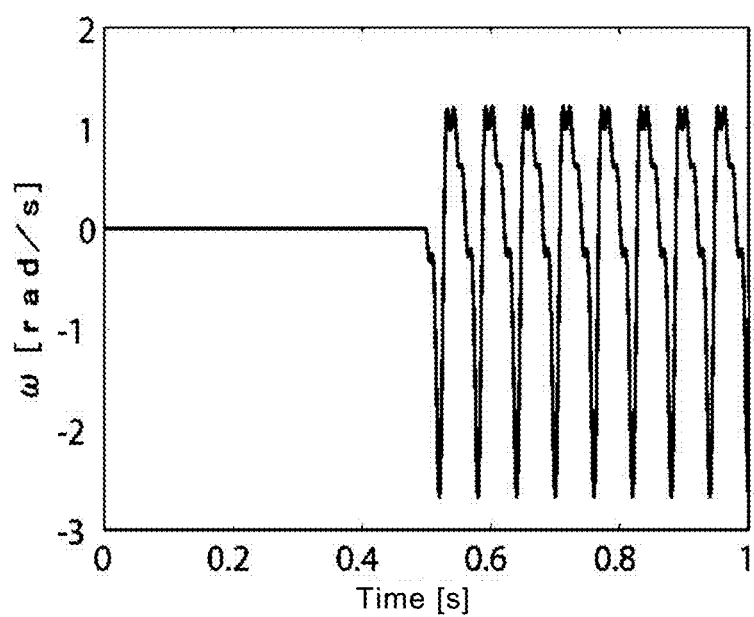
FIG. 9 is an explanatory diagram showing a compensation signal in the learning control unit in the example shown in FIG. 8.

Further, FIG. 8 depicts a rotational speed ω [rad/s] of the spindle motor 7 obtained when a machining simulation was performed in which cutting resistance was set to the same value as the above and, using the varying speed signal generation unit 12, the command value of the rotational speed of the spindle motor 7 was periodically varied in a sinusoidal waveform with the average rotational speed, the speed variation rate RVA, and the speed variation period ratio RVF of the spindle motor 7 set to 104.7 [rad/s], 0.1 and 1.0, respectively. It is noted that, similarly to the above, on and after a time 0.5 [s], compensation signals generated by the learning control unit 15 (compensation signals shown in FIG. 9) were added to the varying speed command signal $\omega_{ref}$ output from the varying speed signal generation unit 12. In FIG. 8, a black solid line indicates the varying speed command signal ωref and a gray broken line indicates the actual rotational speed ω of the spindle motor 7.

As understood from FIG. 8, although a tracking error occurs until 0.5 [s], the disturbance caused by cutting resistance is suppressed by addition of the compensation signals generated by the learning control unit 15 on and after 0.5 [s]. Thus, even when machining is performed while the rotational speed of the spindle motor 7 is periodically varied, the disturbance caused by cutting resistance can be suppressed and the tracking error of the rotational speed can be reduced.

Figure 10:
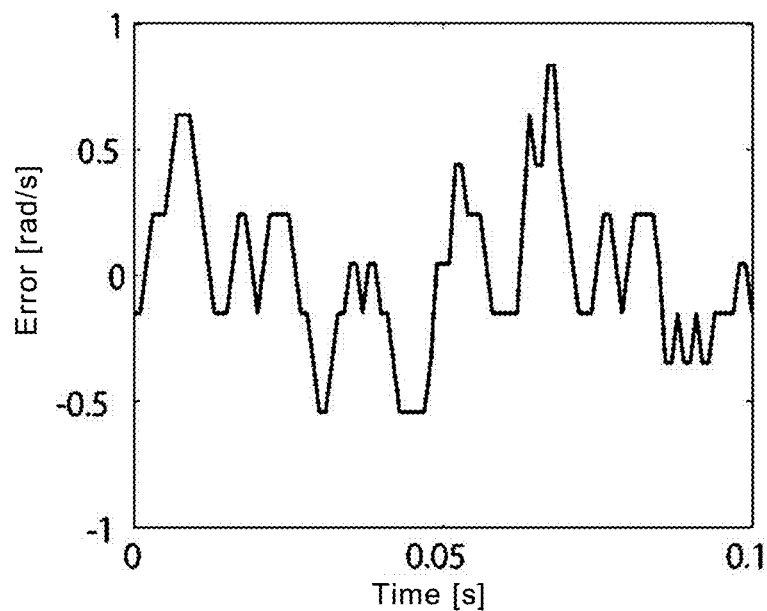
FIG. 10 is an explanatory diagram showing a speed tracking error of the spindle motor that results when the compensation by the learning control unit is not performed in cutting performed with the rotational speed of the spindle motor kept at a constant value of 104.7 [rad/s]
Figure 11:
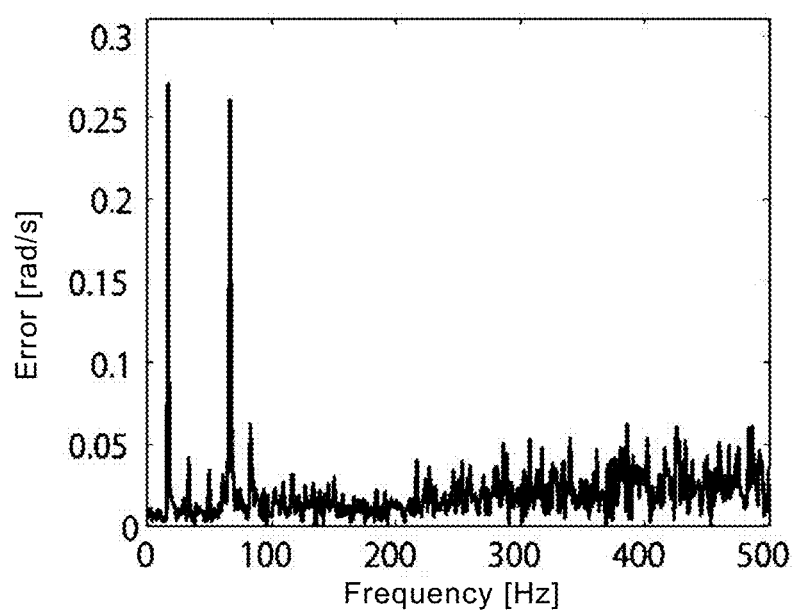
FIG. 11 is an explanatory diagram showing the result of a spectral analysis of the speed tracking error shown in FIG. 10.
Figure 12:
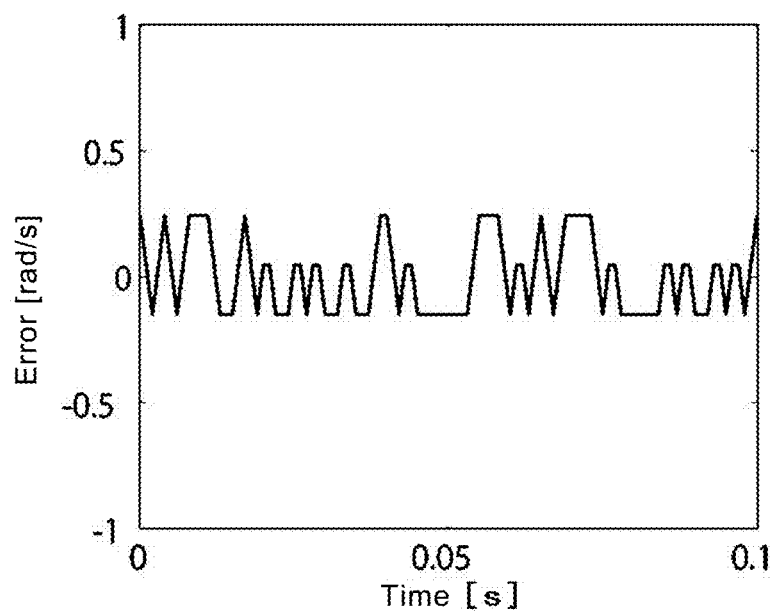
FIG. 12 is an explanatory diagram showing a speed tracking error of the spindle motor that results when compensation by the learning control unit is performed in cutting performed with the rotational speed of the spindle motor kept at a constant value of 104.7 [rad/s]
Figure 13:
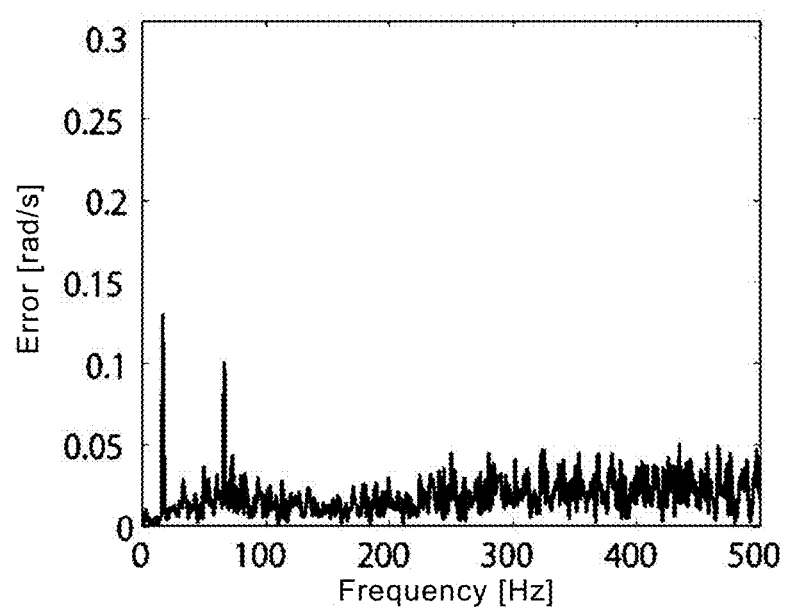
FIG. 13 is an explanatory diagram showing the result of a spectral analysis of the speed tracking error shown in FIG. 12.

Further, FIG. 10 depicts a tracking error of the rotational speed of the spindle motor 7 obtained when a chemical wood was used as a cutting material, machining was performed using an end mill having a diameter of 20 mm and four blades with the width of cut in the diametrical direction se to 20 mm, the depth of cut in the axial direction set to 2 mm, the feed rate set to 643 mm/min-1, and the rotational speed of the spindle motor 7 set to a constant speed of 104.7 [rad/s], and the compensation by the learning control unit 15 was not performed and FIG. 11 depicts the result of a spectrum analysis thereof, whereas FIG. 12 depicts a tracking error of the rotational speed of the spindle motor 7 obtained in the case where the compensation by the learning control unit 15 was performed and FIG. 13 depicts the result of a spectrum analysis thereof. It is noted that the resolution N of the phase θ was set to 2000.

As shown in FIG. 11, the influence of the cutting resistance appears as errors having frequencies of integral multiples of the rotational frequency of the spindle motor 7, 16.7 Hz. However, since the number of pole pairs of the spindle motor 7 is 4, an error having a frequency of four times the rotational period of the spindle motor 7 is caused by the cutting resistance and a torque ripple of the spindle motor 7. As understood by comparisons between FIG. 10 and FIG. 12, and between FIG. 11 and FIG. 13, a tracking error of an integral multiple of the rotational frequency of the spindle motor 7 is suppressed by performing the compensation by the learning control unit 15.

As described in detail above, according to the machine tool 1 having the controller 10 of this embodiment, the tracking error caused cutting resistance, which cannot be sufficiently suppressed by a feedback control, can be suppressed, and even when the spindle motor is driven with the rotational speed thereof varied at predetermined variation amplitude and variation period in order to suppress self-excited chatter vibration while keeping machining accuracy good, the tracking error caused by cutting resistance can be more stably compensated for.

Second Embodiment

Next, a second embodiment of the present disclosure will be described. A machine tool according to the second embodiment has a controller 10' shown in FIG. 18 instead of the controller 10 shown in FIG. 2, and, except for this, has the same configuration as that of the machine tool according to the first embodiment. It is noted that FIG. 2 is a block diagram showing a configuration of the controller 10' of this embodiment.

As shown in FIG. 2, the configuration of the controller 10' of this embodiment is different from that of the controller 10 in that the controller 10' has, instead of the learning control unit 15 of the controller 10 according to the first embodiment, a learning control unit 15' different in function from the learning control unit 15. Therefore, the same components as those of the controller 10 are denoted by the same reference signs and detailed explanation thereof is omitted.

The learning control unit 15' is a processing unit of successively calculating (estimating) a cutting resistance F, which is a disturbance component, based on the deviation e [rad/s] calculated in the feedback control unit 14 every predetermined rotation angle (phase θ) of the spindle motor 7 and storing the estimated cutting resistance F together with the actual rotational speed ω of the spindle motor 7 at that time in a memory of a periodic signal generator (PSG) 16', and, in synchronism with a rotation angle (phase) of the spindle motor 7 corresponding to the varying speed command signal $\omega_{ref}$ input from the varying speed signal generation unit 12 into the current control unit 13, generating a compensation signal based on the estimated cutting resistance F and the actual rotational speed $\omega_a$ corresponding to the rotation angle (phase) and based on the varying speed command signal $\omega_{ref}$ and adding the generated compensation signal to the varying speed command signal $\omega_{ref}$.

As shown in FIG. 3, the phase θ is defined by dividing one revolution of the spindle motor 7 by N (an integer), and the learning control unit 15' stores the estimated cutting resistance F(θ[i]) the actual rotational speed ω(θ[i]) of the spindle motor 7 at that time for each of the phases θ[i] as a data table as shown in FIG. 20 in the memory, where i is integers from 1 to N.

The actual rotation angle (actual phase θ) and the actual rotational speed w of the spindle motor 7 are detected by the rotary encoder or the like, and the learning control unit 15' successively calculates the estimated cutting resistances F (θ[i]) of each of the phases θ[i] according to the Equation 3 and stores the calculated cutting resistance F together with the actual rotational speed ω (θ[i]) at that time as a data table (cutting resistance table) as shown in FIG. 20 in the memory of the PSG 16' while successively updating the data table.

On the other hand, the learning control unit 15' calculates a phase θ of the spindle motor 7 corresponding to the varying speed command signal $\omega_{ref}$ input from the varying speed signal generation unit 12 into the current control unit 13, reads out the estimated cutting resistance F(θ) and the actual rotational speed ω (θ) corresponding to the phase θ from the memory, and generates a compensation signal based on the estimated cutting resistance F(θ) and actual rotational speed ω(θ) read out and based on the varying speed command signal $\omega_{ref}$, and adds the generated compensation signal to the varying speed command signal $\omega_{ref}$.

The phase θ of the spindle motor 7 corresponding to the varying speed command signal ωref is a phase θ[i+1] which is advanced by one phase from the actual phase θ[i] of the spindle motor 7, and the phase θ[i+1] is calculated by the Equation 4, as shown in FIG. 19.

Based on the phase θ[i+1] calculated by the Equation 4, the learning control unit 15' reads out the estimated cutting resistance F(θ[i+1]) and the actual rotational speed ω(θ[i+1]) corresponding to the phase θ[i+1] from the memory and generates a compensation signal CF(θ[i+1]) according to the following equation based on the estimated cutting resistance F(θ[i+1]) and actual rotational speed ω(θ[i+1]) read out and based on the varying speed command signal ωref(θ[i+1]):

$$C_{F\theta}(s) = \omega(\theta) \cdot F_\theta(s) \cdot P(s)/(\omega_{ref}(\theta) \cdot (1 + C(s) \cdot P(s))), \quad \text{(Equation 7)}$$

where $C_{F\theta}(s)$ is a compensation signal when the rotation angle of the spindle motor 7 is θ, $F_\theta(s)$ is a disturbance component when the rotation angle of the spindle motor 7 is θ, which is stored in the memory, and ω(θ) is the actual rotational speed when the rotation angle of the spindle motor 7 is θ, which is stored in the memory, and is a scalar value. Further, $\omega_{ref}(\theta)$ is a commanded rotational speed of the varying speed command signal when the rotation angle of the spindle motor 7 is θ, and is a scalar value. Furthermore, C(s) is a transfer function when the correction signal is generated in the feedback control unit, and P(s) is a transfer function of the spindle motor.

It is noted that FIG. 19 shows a conceptual block diagram showing the processing of calculating the phase θ[i+1], the processing of storing the estimated cutting resistance $F(\theta[i])$ and the actual rotational speed ω (θ[i]), and the processing of reading out the estimated cutting resistance $F(\theta[i+1])$ and the actual rotational speed ω(θ[i+1]).

Subsequently, the learning control unit 15' multiplies the calculated compensation signal $C_F(\theta[i+1])$ by the function Q[z] (the Equation 6), and then adds the result of the multiplication to the varying speed command signal $\omega_{ref}(\theta[i+1])$ input from the varying speed signal generation unit 12 into the current control unit 13.

Thus, according to the controller 10' of this embodiment having the above-described configuration, first, the feedback control unit 14 generates a correction signal corresponding to a deviation e between a nominal value $\omega_0$ of the varying speed command signal $\omega_{ref}$ output from the varying speed signal generation unit 12 and a present rotational speed ω of the spindle motor 7, that, a tracking error e, and correction is performed using this correction signal.

Further, by the learning control unit 15', a disturbance component caused the cutting resistance F in machining is calculated based on the deviation e every predetermined phase θ of the spindle motor 7 and the calculated disturbance components are stored, and, on the other hand, in synchronism with a phase θ[i+1] of the spindle motor 7 corresponding to the varying speed command signal $\omega_{ref}(\theta[i+1])$ input from the varying speed signal generation unit 12 into the current control unit 13, the cutting resistance $F(\theta[i+1])$ corresponding to the phase θ[i+1], that is, a cutting resistance $F(\theta[i+1])$ estimated one revolution before with respect to the phase θ[i+1] is read out, and a compensation signal $C_F(\theta[i+1])$ is generated according to the Equation 7 where the estimated cutting resistance $F(\theta[i+1])$ read out is multiplied by a ratio of the actual rotational speed ω(θ[i+1]) to the varying speed command signal $\omega_{ref}(\theta[i+1])$, that is, $\omega(\theta[i+1])/\omega_{ref}(\theta[i+1])$ and the generated compensation signal $C_F(\theta[i+1])$ is added to the varying speed command signal $\omega_{ref}(\theta[i+1])$ to previously correct the tracking error e which will occur due to the disturbance component, that is, a feed-forward control is performed.

As described above, the disturbance component caused by the cutting resistance is in inverse proportion to the rotational speed of the spindle motor 7. Therefore, the cutting resistance which is estimated to occur due to the varying speed command signal $\omega_{ref}(\theta[i+1])$ can be estimated accurately by multiplying the estimated cutting resistance $F(\theta[i+1])$ one revolution before by a ratio of the actual rotational speed ω(θ[i+1]) to the varying speed command signal $\omega_{ref}(\theta[i+1])$, that is, $\omega(\theta[i+1])/\omega_{ref}(\theta[i+1])$. In the learning control unit 15' of this embodiment, since the compensation signal $C_F(\theta[i+1])$ is generated by multiplying the estimated cutting resistance $F(\theta[i+1])$ by $\omega(\theta[i+1])/\omega_{ref}(\theta[i+1])$, an accurate compensation signal $C_F(\theta[i+1])$ corresponding to the varying speed command signal $\omega_{ref}(\theta[i+1])$ can be generated, and the tracking error e caused by the cutting resistance F can be suppressed more effectively.

As described above, according to the controller 10' of this embodiment, even when the spindle motor 7 is driven with the rotational speed thereof varied at predetermined variation amplitude and variation period in order to suppress self-excited chattering vibration while keeping machining accuracy good, the tracking error e caused by cutting resistance F can be more stably compensated for.

Figure 21:
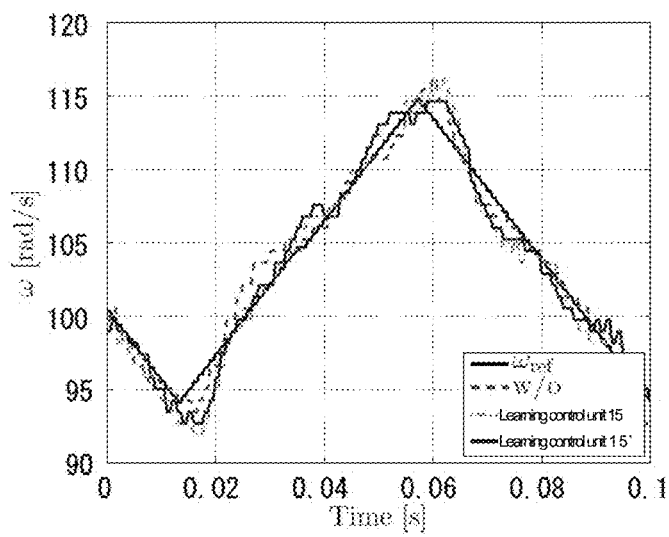
FIG. 21 is an explanatory diagram for explaining an effect of the learning control unit according to the second embodiment.
Figure 22:
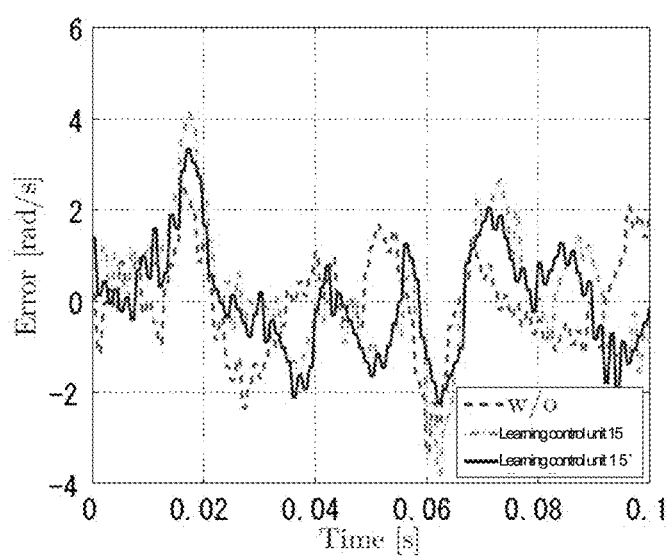
FIG. 22 is an explanatory diagram for explaining the effect of the learning control unit according to the second embodiment.

In this connection, an aluminum as a cutting material was machined using the machine tool 1 shown in FIG. 1 with the command value of the rotational speed of the spindle motor 7 periodically varied in a triangular waveform and where cutting resistance was set as appropriate the average rotational speed of the spindle motor 7, the speed variation rate RVA, and the speed variation period ratio RVF were set to 104.7 [rad/s], 0.1, and 0.7, respectively, by the varying speed generation unit 12, and the rotational speed of the spindle motor 7 in the case where the compensation by the learning control unit 15 of the first embodiment was performed and the rotational speed of the spindle motor 7 in the case where the compensation by the learning control unit 15' of the second embodiment were measured. FIG. 21 shows the measured rotational speeds ω [rad/s] of the spindle motor 7 and FIG. 22 shows the tracking errors to the command value of the rotational speed (varying speed command). It is noted that, in FIG. 21, $\omega_{ref}$ is the varying speed command, and in FIGS. 21 and 22, w/o indicates a case where neither the compensation by the learning control unit 15 nor the compensation by the learning control unit 15' was performed.

As shown in FIGS. 21 and 22, the tracking error is more suppressed by the compensation by the learning control unit 15' of the second embodiment than by the compensation by the learning control unit 15 of the first embodiment.

Thus, according to the controller 10' of this embodiment, the tracking error caused cutting resistance, which cannot be sufficiently suppressed by feedback control, can be suppressed, and even when the spindle motor is driven with the rotational speed thereof varied at predetermined variation amplitude and variation period in order to suppress self-excited chatter vibration while keeping machining accuracy good, the tracking error caused by cutting resistance can be more stably compensated for.

Although specific embodiments of the present disclosure have been described above, the embodiment which can be taken by the present disclosure is not limited to the above embodiments.

For example, although, in both of the above-described first and second embodiments, the Q filter is provided and, after the compensation signal $C_F(\theta[i+1])$ is multiplied by the function Q[z], the result of the multiplication is added to the varying speed command signal $\omega_{ref}(\theta[i+1])$ input from the varying speed signal generation unit 12 into the current control unit 13, the Q filter has not to be always provided and the compensation signal $C_F(\theta[i+1])$ may be added to the varying speed command signal $\omega_{ref}(\theta[i+1])$ as it is.

What is claimed is:

1. A controller, for controlling a spindle motor which rotates a spindle of a machine tool, comprising:
a varying speed signal generation unit which receives a speed command signal relating to a target rotational speed of the spindle motor and generates a varying speed command signal varying at predetermined amplitude and period with respect to the target rotational speed and outputs the generated varying speed command signal;
a current control unit which generates a current command signal for driving the spindle motor based on the varying speed command signal input from the varying speed signal generation unit and outputs the generated current command signal;

a feedback control unit which generates a correction signal based on a deviation between the varying speed command signal output from the varying speed signal generation unit and a signal relating to a present rotational speed of the spindle motor and adds the generated correction signal to the current command signal; and a learning control unit which has a memory for storing therein a disturbance component caused by cutting resistance in machining, and successively calculates the disturbance component based on the deviation every predetermined rotation angle of the spindle motor and stores the calculated disturbance component in the memory, and which, in synchronism with a rotation angle of the spindle motor corresponding to the varying speed command signal input from the varying speed signal generation unit into the current control unit, reads out the disturbance component one revolution before corresponding to the rotation angle from the memory, generates a compensation signal based on the read-out disturbance component, and adds the generated compensation signal to the varying speed command signal, wherein, when the disturbance component is represented as $F_\theta(s)$ and the compensation signal is represented as $C_{F\theta}(s)$, the learning control unit calculates the disturbance component $F_\theta(s)$ and the compensation signal $C_{F\theta}(s)$ according to the following equations, respectively:

$$F_\theta(s)=e_\theta(s)\cdot(1+C(s)\cdot P(s))/P(s); \text{ and}$$

$$C_{F\theta}(s)=F_\theta(s)\cdot P(s)/(1+C(s)\cdot P(s)),$$

where $F_\theta(s)$ is the disturbance component when the rotation angle of the spindle motor is $\theta$, $e_\theta(s)$ is the deviation when the rotation angle of the spindle motor is $\theta$, $C_{F\theta}(s)$ is the compensation signal when the rotation angle of the spindle motor is $\theta$, $C(s)$ is a transfer function when the correction signal is generated in the feedback control unit, and $P(s)$ is a transfer function of the spindle motor.

2. A controller, for controlling a spindle motor which rotates a spindle of a machine tool, comprising:

a varying speed signal generation unit which receives a speed command signal relating to a target rotational speed of the spindle motor and generates a varying speed command signal varying at predetermined amplitude and period with respect to the target rotational speed and outputs the generated varying speed command signal;

a current control unit which generates a current command signal for driving the spindle motor based on the varying speed command signal input from the varying speed signal generation unit and outputs the generated current command signal;

a feedback control unit which generates a correction signal based on a deviation between the varying speed command signal output from the varying speed signal generation unit and a signal relating to a present rotational speed of the spindle motor and adds the generated correction signal to the current command signal; and a leaning control unit which has a memory for storing therein a disturbance component caused by cutting resistance in machining, and successively calculates the disturbance component based on the deviation every predetermined rotation angle of the spindle motor and stores the calculated disturbance component and an actual rotational speed of the spindle motor at a position of the rotation angle with the calculated disturbance component and the actual rotational speed related with each other for each of the rotation angles in the memory, and in synchronism with a rotation angle of the spindle motor corresponding to the varying speed command signal input from the varying speed signal generation unit into the current control unit, reads out the disturbance component and the actual rotational speed one revolution before corresponding to the rotation angle, generates a compensation signal based on the read-out disturbance component and the read-out actual rotation speed and based on the varying speed command signal and adds the generated compensation signal to the varying speed command signal.

3. The controller of claim 2, wherein, when the disturbance component is represented as $F_\theta(s)$ and the compensation signal is represented as $C_{F\theta}(s)$, the leaning control unit calculates the disturbance component $F_\theta(s)$ and the compensation signal $C_{F\theta}(s)$ according to following equations, respectively:

$$F_\theta(s)=e_\theta(s)\cdot(1+C(s)\cdot P(s))/P(s); \text{ and}$$

$$C_{F\theta}(s)=\omega(\theta)\cdot F_\theta(s)\cdot P(s)/(\omega_{ref}(\theta)\cdot(1+C(s)\cdot P(s))),$$

where $F_\theta(s)$ the disturbance component when the rotation angle of the spindle motor is $\theta$, $e_\theta(s)$ is the deviation when the rotation angle of the spindle motor is $\theta$, $C_{F\theta}(s)$ is the compensation signal when the rotation angle of the spindle motor is $\theta$, $\omega(\theta)$ is the actual rotational speed when the rotation angle of the spindle motor is $\theta$, and is a scalar value, $\omega_{ref}(\theta)$ is a commanded rotational speed of the varying speed command signal when the rotation angle of the spindle motor is $\theta$, and is a scalar value, $C(s)$ is a transfer function when the correction signal is generated in the feedback control unit, and $P(s)$ is a transfer function of the spindle motor.

* * * * *